United States Patent Office.

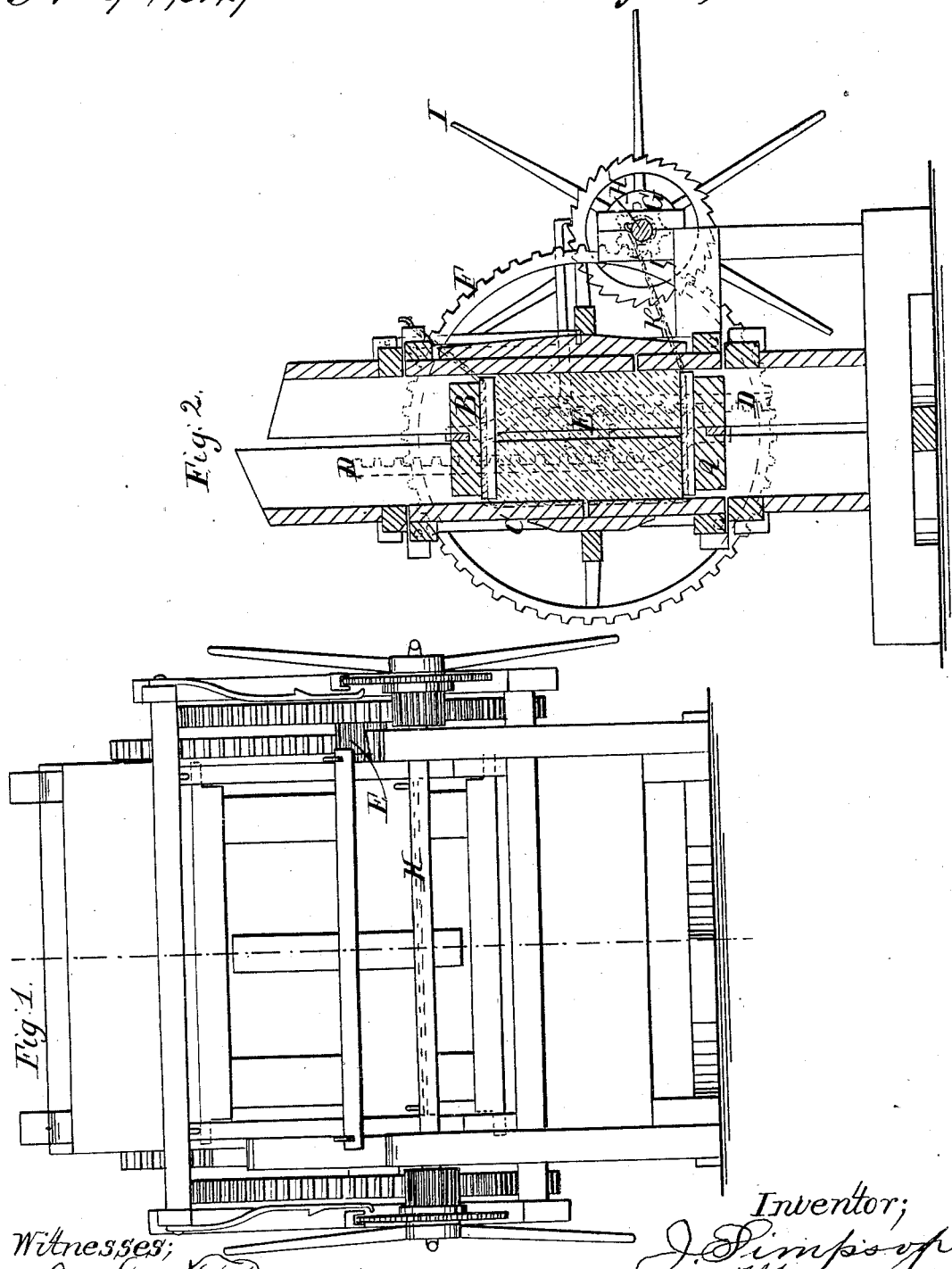

JOHN SIMPSON, OF CHESTER, SOUTH CAROLINA.

Letters Patent No. 94,347, dated August 31, 1869.

IMPROVEMENT IN HAY AND COTTON-PRESSES.

The Schedule referred to in these Letters Patent and making part of the same.

*To all whom it may concern:*

Be it known that I, JOHN SIMPSON, of Chester, in the district of Chester, and State of South Carolina, have invented a new and useful Improvement in Presses for Cotton and other Substances; and I do hereby declare that the following is a full, clear, and exact description thereof, which will enable others skilled in the art to make and use the same, reference being had to the accompanying drawings, forming part of this specification.

This invention relates to improvements in presses for baling cotton, hay, &c., designed to provide a more simple and effective press than any now in use.

The invention consists in the combination and arrangement of parts, as will be hereinafter fully described, for discharging the bale from the press.

Figure 1 represents a front elevation of my improved press, and

Figure 2 represents a transverse sectional elevation of the same.

Similar letters of reference indicate corresponding parts.

I arrange two followers, A and B, to work in one case, to and from each other, and between which the substance to be pressed is placed.

Each follower is provided, at each end, with toothed racks D, those of the upper follower projecting downward, and those of the lower one projecting upward.

Between the racks of each follower, at each end, toothed pinions E are arranged to gear into them, so that when turned in one direction, they will force the followers together, and away from each other when turned in the opposite direction.

On the same shafts to which the pinions are secured are large spur-wheels F, into which other pinions G, on a common driving-shaft, H, running from end to end of the press, work.

The said shaft may be operated by winch-handles, cranks, or otherwise.

The case is provided with doors on each side, for the admission of the substance to be packed, and for the removal of the bales.

If required, the upper follower may be raised so high as to work out of gear with the pinions, and it may be removed, for filling the case with the substance to be packed.

To facilitate the removal of the bale from the press, I provide one or more cords, K, fastened at one end of the shaft H, so as to be wound thereon when the followers are separated, and secured at the other end to hooks at the top of the press, after passing across the space wherein the substance is to be packed, and along the opposite side, as shown in fig. 2, so as to pass around the substance forming the bale, and draw it out as the said cord is wound on the shaft.

The shaft H is provided with ratchet-wheels, which, together with suitable pawls, serve to hold the shaft and the followers in any required position.

Having thus described my invention,

I claim as new, and desire to secure by Letters Patent—

1. The cords K, when so arranged as to be wound automatically upon the shaft H as the followers are moved apart, as herein shown and described, for the purpose set forth.

2. The arrangement of the followers A and B, racks D, pinions E, spur-wheels F, shaft H, and its pinions G, ratchets L, and pawls M, all arranged to operate together substantially as herein shown and described.

The above specification of my invention signed by me, this 21st day of February, 1869.

JOHN SIMPSON.

Witnesses:
    J. M. McDANIEL,
    GEORGE McCORMICK.